United States Patent
Wang et al.

(10) Patent No.: US 11,403,636 B2
(45) Date of Patent: *Aug. 2, 2022

(54) BLOCKCHAIN-BASED TRANSACTION PROCESSING METHOD AND APPARATUS, AND ELECTRONIC DEVICE

(71) Applicant: Advanced New Technologies Co., Ltd., Grand Cayman (KY)

(72) Inventors: Jiyuan Wang, Hangzhou (CN); Huabing Du, Hangzhou (CN); Xuebing Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/350,821

(22) Filed: Jun. 17, 2021

(65) Prior Publication Data

US 2021/0312442 A1 Oct. 7, 2021

Related U.S. Application Data

(63) Continuation of application No. 16/425,195, filed on May 29, 2019, now Pat. No. 11,270,307.

(30) Foreign Application Priority Data

May 29, 2018 (CN) .......................... 201810532710.7

(51) Int. Cl.
*G06Q 20/40* (2012.01)
*G06F 16/27* (2019.01)
(Continued)

(52) U.S. Cl.
CPC .......... *G06Q 20/401* (2013.01); *G06F 16/24* (2019.01); *G06F 16/275* (2019.01); *G06Q 20/02* (2013.01);
(Continued)

(58) Field of Classification Search
None
See application file for complete search history.

(56) References Cited

U.S. PATENT DOCUMENTS 5,142,627 A * 8/1992 Elliot .................... G06F 3/0601
710/5
5,982,893 A * 11/1999 Hughes ................ G06Q 20/401
705/75

(Continued)

FOREIGN PATENT DOCUMENTS

CN 105469510 4/2016
CN 106789875 5/2017
(Continued)

OTHER PUBLICATIONS

Danezis, George • Meiklejohn, Sarah, Centrally Banked Cryptocurrencies, May 26, 2015 https://arxiv.org/abs/1505.06895 (Year: 2015).*

(Continued)

*Primary Examiner* — Neha Patel
*Assistant Examiner* — Jahed Ali
(74) *Attorney, Agent, or Firm* — Fish & Richardson P.C.

(57) ABSTRACT

A computer-implemented method for processing blockchain-based transactions, the computer-implemented method including: receiving a target transaction initiated by a member node device in a blockchain, wherein the target transaction comprises a unique identifier of the target transaction; querying a transaction idempotent table on the block chain to determine whether the transaction idempotent table has stored a transaction idempotent record corresponding to the unique identifier of the target transaction; and in response to determining that the transaction idempotent table has not stored the transaction idempotent record cor- (Continued)

responding to the unique identifier of the target transaction, recording the target transaction in a candidate block on the blockchain.

14 Claims, 4 Drawing Sheets

(51) Int. Cl.
| | |
|---|---|
| *G06F 16/24* | (2019.01) |
| *G06Q 20/02* | (2012.01) |
| *H04L 9/06* | (2006.01) |
| *H04L 9/32* | (2006.01) |

(52) U.S. Cl.
CPC .......... *H04L 9/0643* (2013.01); *H04L 9/3247* (2013.01); *H04L 9/3297* (2013.01); *G06Q 2220/123* (2013.01); *H04L 2209/38* (2013.01)

(56) References Cited

U.S. PATENT DOCUMENTS

| | | | | |
|---|---|---|---|---|
| 6,249,774 | B1* | 6/2001 | Roden | G06Q 10/06315 |
| | | | | 700/106 |
| 9,280,591 | B1* | 3/2016 | Kharatishvili | G06F 16/27 |
| 10,509,919 | B1* | 12/2019 | Wang | G06F 21/6227 |
| 10,692,078 | B1* | 6/2020 | Kuo | G06Q 20/357 |
| 10,713,659 | B2* | 7/2020 | Hoyos | G06F 21/552 |
| 10,733,602 | B2* | 8/2020 | Setty | G06Q 20/3827 |
| 2001/0054155 | A1* | 12/2001 | Hagan | H04L 69/329 |
| | | | | 713/193 |
| 2007/0101412 | A1* | 5/2007 | Yang | G06F 21/305 |
| | | | | 726/5 |
| 2007/0176744 | A1* | 8/2007 | Park | G06Q 20/341 |
| | | | | 340/10.1 |
| 2009/0046716 | A1* | 2/2009 | Witham | G06F 15/173 |
| | | | | 370/390 |
| 2012/0117423 | A1* | 5/2012 | Andrade | G06F 11/1438 |
| | | | | 714/15 |
| 2013/0166505 | A1* | 6/2013 | Peretz | G06F 11/2041 |
| | | | | 707/611 |
| 2015/0172390 | A1* | 6/2015 | Colrain | H04L 67/42 |
| | | | | 709/203 |
| 2015/0220917 | A1* | 8/2015 | Aabye | G06Q 20/3278 |
| | | | | 705/64 |
| 2015/0278281 | A1* | 10/2015 | Zhang | G06F 16/128 |
| | | | | 707/703 |
| 2016/0088014 | A1* | 3/2016 | Chandran | H04L 63/0227 |
| | | | | 726/23 |
| 2016/0164884 | A1* | 6/2016 | Sriram | G06Q 10/087 |
| | | | | 705/51 |
| 2016/0342616 | A1* | 11/2016 | Wang | G06F 9/45533 |
| 2017/0034197 | A1* | 2/2017 | Daniel | H04L 9/3236 |
| 2017/0149819 | A1* | 5/2017 | Androulaki | H04L 63/0823 |
| 2018/0089683 | A1* | 3/2018 | Setty | G06Q 20/065 |
| 2018/0101914 | A1* | 4/2018 | Samuel | G06Q 20/102 |
| 2018/0293556 | A1* | 10/2018 | Hyun | G06Q 20/4014 |
| 2018/0315047 | A1* | 11/2018 | Kennedy | G06Q 20/02 |
| 2018/0323965 | A1* | 11/2018 | Yanagisawa | H04L 9/0637 |
| 2018/0336552 | A1* | 11/2018 | Bohli | H04L 67/1097 |
| 2019/0020729 | A1* | 1/2019 | Chen | H04L 67/10 |
| 2019/0028555 | A1* | 1/2019 | Du | H04L 67/16 |
| 2019/0130042 | A1* | 5/2019 | Gabriel | G06Q 20/389 |
| 2019/0156332 | A1* | 5/2019 | Christidis | H04L 9/14 |
| 2019/0266145 | A1* | 8/2019 | Qiu | G06Q 20/3827 |
| 2019/0347657 | A1* | 11/2019 | Guo | G06Q 20/10 |
| 2019/0370486 | A1* | 12/2019 | Wang | G06Q 20/405 |
| 2019/0370806 | A1* | 12/2019 | Wang | G06Q 20/389 |
| 2020/0050786 | A1* | 2/2020 | Wang | G06Q 20/382 |
| 2020/0106718 | A1* | 4/2020 | Lesartre | H04L 47/6275 |
| 2020/0162579 | A1* | 5/2020 | Chen | H04L 67/10 |
| 2020/0193430 | A1* | 6/2020 | Jiang | G06Q 20/3827 |
| 2021/0312442 | A1* | 10/2021 | Wang | G06Q 20/389 |

FOREIGN PATENT DOCUMENTS

| | | | |
|---|---|---|---|
| CN | 106991607 | 7/2017 | |
| CN | 107292622 | 10/2017 | |
| CN | 107480990 | 12/2017 | |
| CN | 107528882 | 12/2017 | |
| CN | 107528882 A | * 12/2017 | .......... H04L 9/0637 |
| JP | 2020528607 | 9/2020 | |
| KR | 101660627 | 9/2016 | |
| TW | 201812674 | 4/2018 | |

OTHER PUBLICATIONS

Bitzuma.com [online],"Three Solutions to the Double Spending Problem," Apr. 9, 2018, retrieved on Apr. 1, 2021, retrieved from URL <https://bitzuma.com/posts/three-solutions-to-the-double-spending-problem/>, 9 pages.

Da Silva et al., "Fixed transaction ordering and admission in blockchains," European Conference on Computer Systems (EuroSys 2018), 12th EuroSysDoctoral Workshop, Apr. 23, 2018, retrieved from URL <https://conferences.inf.ed.ac.uk/EuroDW2018/papers/eurodw18-Silva.pdf>, 4 pages.

Crosby et al., "BlockChain Technology: Beyond Bitcoin," Sutardja Center for Entrepreneurship & Technology Technical Report, Oct. 16, 2015, 35 pages.

Danezis et al., "Centrally Banked Cryptocurrencies," Cornell University, May 2015, 15 pages.

Mastering Bitcoin—Unlocking Digital Cryptocurrencies, 1st ed., O'Reilly Media, Inc., Dec. 2014, Chapter 5, 28 pages.

Nakamoto, "Bitcoin: A Peer-to-Peer Electronic Cash System," www.bitcoin.org, 2005, 9 pages.

PCT International Preliminary Report on Patentability in International Application No. PCT/US2019/034271, dated Dec. 1, 2020, 6 pages.

PCT International Search Report and Written Opinion in International Application No. PCT/US2019/034271, dated Aug. 13, 2019, 13 pages.

Stackoverflow.com [online], "Representing Number Ranges in a Relational Database (MySQL)," Oct. 2016, retrieved on Aug. 13, 2019, retrieved from URL<https://stackoverflow.com/questions/5868907/representing-number-ranges-in-a-relational-database-mysql>, 4 pages.

\* cited by examiner

BLOCKCHAIN-BASED TRANSACTION PROCESSING METHOD AND APPARATUS, AND ELECTRONIC DEVICE

CROSS-REFERENCE TO RELATED APPLICATIONS

This application is a continuation of U.S. application Ser. No. 16/425,195, now allowed, filed on May 29, 2019, which claims priority to Chinese Patent Application No. 201810532710.7, filed on May 29, 2018, and each application is hereby incorporated by reference in its entirety.

TECHNICAL FIELD

One or more implementations of the present application relate to the field of blockchain technologies, and in particular, to a blockchain-based transaction processing method and apparatus, and an electronic device.

BACKGROUND

A blockchain technology, also referred to as a distributed ledger technology, is a new technology where some computing devices jointly participate in "accounting" to maintain a complete distributed database. The blockchain technology features decentralization, openness, and transparency. Each computing device can record data in the database, and the data can be synchronized rapidly between the computing devices. Therefore, using the blockchain technology to create a decentralized system and record various execution programs in a distributed database of a blockchain for automatic execution has been widely applied to many fields.

SUMMARY

The present application provides a blockchain-based transaction processing method, including the following: receiving a target transaction initiated by a member node device in a blockchain, where the target transaction includes a unique identifier of the target transaction; querying whether a preset transaction idempotent table stores a transaction idempotent record corresponding to the unique identifier of the target transaction; and recording the target transaction in a candidate block if the transaction idempotent table has not stored the transaction idempotent record corresponding to the unique identifier of the target transaction.

Optionally, a transaction idempotent record in the transaction idempotent table indicates that a transaction corresponding to the transaction idempotent record has been successfully recorded in a distributed database of the blockchain.

Optionally, the method further includes the following: if the target transaction is recorded in the candidate blocks, and the candidate block has passed consensus to be successfully stored in the distributed database of the blockchain, generating the transaction idempotent record corresponding to the unique identifier of the target transaction, and inserting the generated transaction idempotent record corresponding to the unique identifier of the target transaction into the transaction idempotent table.

Optionally, a transaction idempotent record in the transaction idempotent table is a unique identifier of a transaction, and unique identifiers of transactions initiated by member node devices in the blockchain are monotonically increasing transaction identifiers; and the method further includes the following: determining whether the transaction idempotent table includes a plurality of monotonically increasing transaction identifiers with consecutive values after the unique identifier of the transaction is inserted into the transaction idempotent table; and if yes, recording the plurality of monotonically increasing transaction identifiers with consecutive values in the transaction idempotent table in the form of an interval; or if no, recording the transaction identifier of the transaction in the transaction idempotent table in the form of a discrete value.

Optionally, the target transaction further includes a reference time parameter, and the reference time parameter is used to determine whether the target transaction is a valid transaction within a transaction validity period; and before the querying whether a preset transaction idempotent table stores a transaction idempotent record corresponding to the unique identifier of the target transaction, the method further includes the following: determining whether the target transaction is a valid transaction within the transaction validity period based on the reference time parameter; and further querying whether the preset transaction idempotent table stores the transaction idempotent record corresponding to the unique identifier of the target transaction if it is determined that the target transaction is a valid transaction within the transaction validity period.

Optionally, the blockchain is a consortium blockchain.

The present application further provides a blockchain-based transaction processing apparatus, including the following: a receiving module, configured to receive a target transaction initiated by a member node device in a blockchain, where the target transaction includes a unique identifier of the target transaction; a query module, configured to query whether a preset transaction idempotent table stores a transaction idempotent record corresponding to the unique identifier of the target transaction; and a recording module, configured to record the target transaction in a candidate block if the transaction idempotent table has not stored the transaction idempotent record corresponding to the unique identifier of the target transaction.

Optionally, a transaction idempotent record in the transaction idempotent table indicates that a transaction corresponding to the transaction idempotent record has been successfully recorded in a distributed database of the blockchain.

Optionally, the recording module is further configured to: if the target transaction is recorded in the candidate blocks, and the candidate block has passed consensus to be successfully stored in the distributed database of the blockchain, generate the transaction idempotent record corresponding to the unique identifier of the target transaction, and insert the generated transaction idempotent record corresponding to the unique identifier of the target transaction into the transaction idempotent table.

Optionally, a transaction idempotent record in the transaction idempotent table is a unique identifier of a transaction, and unique identifiers of transactions initiated by member node devices in the blockchain are monotonically increasing transaction identifiers; and the recording module is further configured to determine whether the transaction idempotent table includes a plurality of monotonically increasing transaction identifiers with consecutive values after the unique identifier of the transaction is inserted into the transaction idempotent table; and if yes, record the plurality of monotonically increasing transaction identifiers with consecutive values in the transaction idempotent table in the form of an interval; or if no, record the transaction identifier of the transaction in the transaction idempotent table in the form of a discrete value.

Optionally, the target transaction further includes a reference time parameter, and the reference time parameter is used to determine whether the target transaction is a valid transaction within a transaction validity period; and the apparatus further includes the following: a determining module, configured to determine whether the target transaction is a valid transaction within the transaction validity period based on the reference time parameter before it is queried whether the preset transaction idempotent table stores the transaction idempotent record corresponding to the unique identifier of the target transaction; and further query whether the preset transaction idempotent table stores the transaction idempotent record corresponding to the unique identifier of the target transaction if it is determined that the target transaction is a valid transaction within the transaction validity period.

Optionally, the blockchain is a consortium blockchain.

The present application further provides an electronic device, including the following: a processor; and a memory, configured to store a machine executable instruction, where by reading and executing the machine executable instruction that is stored in the memory and corresponds to control logic of blockchain-based transaction processing, the processor is configured to receive a target transaction initiated by a member node device in a blockchain, where the target transaction includes a unique identifier of the target transaction; query whether a preset transaction idempotent table stores a transaction idempotent record corresponding to the unique identifier of the target transaction; and record the target transaction in a candidate block if the transaction idempotent table has not stored the transaction idempotent record corresponding to the unique identifier of the target transaction.

DESCRIPTION OF IMPLEMENTATIONS

The present application is to provide technical solutions that a created transaction idempotent table is used to perform idempotent processing on a received transaction in a blockchain, so that an illegitimate node cannot initiate a replay attack by using an intercepted overdue transaction.

During implementation, node devices that can serve as accounting nodes in the blockchain can jointly maintain a transaction idempotent table. For example, the node devices serving as accounting nodes can jointly maintain a consensus transaction idempotent table by using an existing consensus mechanism in the blockchain.

A transaction idempotent record in the transaction idempotent table indicates that a transaction corresponding to the transaction idempotent record has been successfully recorded in a distributed database of the blockchain.

When a user creates a transaction on a client side, the client side can generate a unique identifier for the transaction and add the unique identifier to the transaction, and then a node device connected to the client side publishes the transaction in the blockchain.

After another node device in the blockchain receives the transaction and verifies that the transaction is valid, the node device can further query the transaction idempotent table to determine whether the transaction idempotent table stores a transaction idempotent record corresponding to the unique identifier of the transaction.

If the transaction idempotent table has not stored the transaction idempotent record corresponding to the unique identifier of the transaction, it indicates that the transaction has not been successfully recorded in the distributed database of the blockchain. In this case, the transaction can be recorded in a candidate block. On the contrary, if the transaction idempotent table has stored the transaction idempotent record corresponding to the unique identifier of the transaction, it indicates that the transaction has been successfully recorded in the distributed database of the blockchain, and is a transaction that has been processed and executed in the blockchain. In this case, the transaction can be directly discarded without being processed.

According to the previous technical solutions, a transaction can be recorded in the candidate block as a valid transaction only when a transaction idempotent record related to the transaction is stored in the transaction idempotent table. As such, an illegitimate node device in the blockchain cannot initiate a replay attack in the blockchain by using an intercepted overdue transaction, thereby increasing a transaction security level of the blockchain.

The following describes the specification by using specific implementations based on specific application scenarios.

Figure 1:
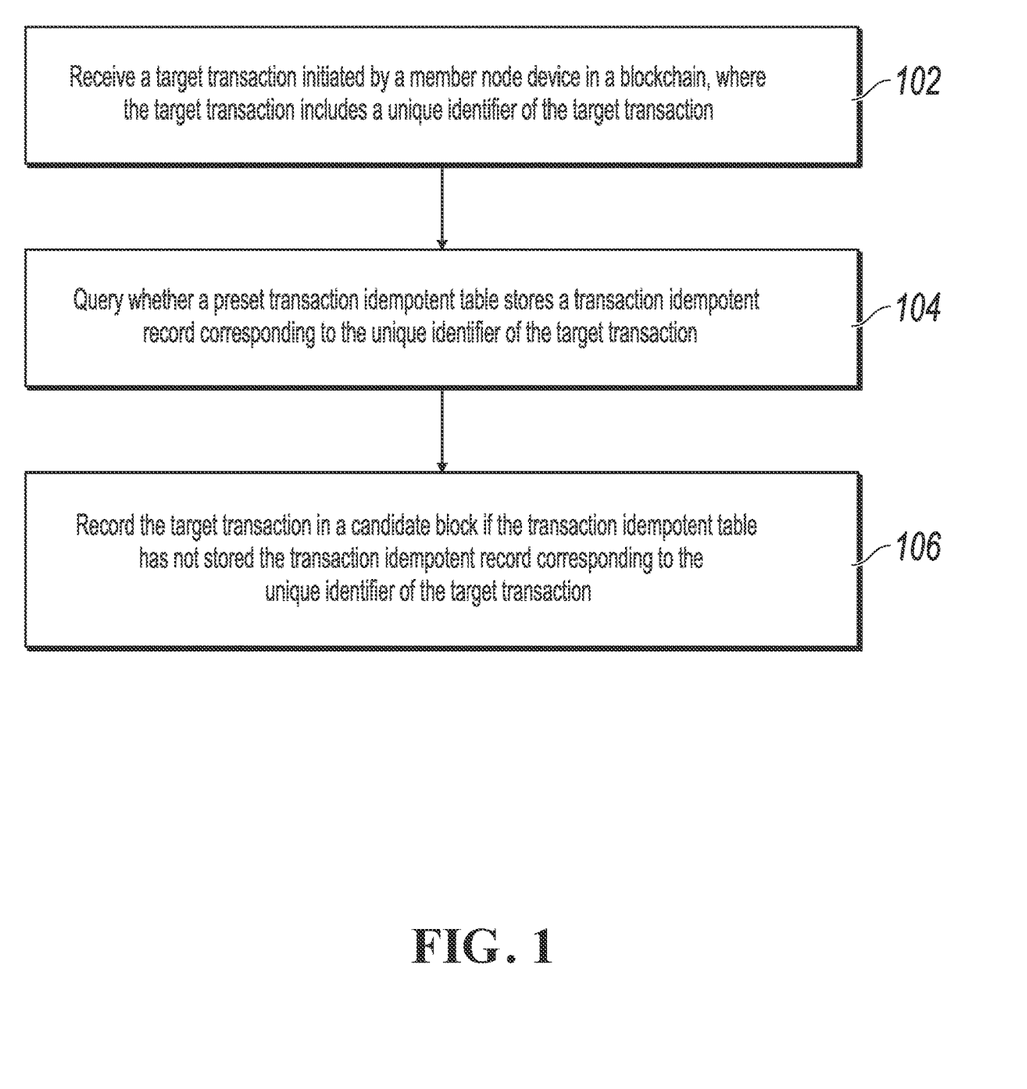
FIG. 1 is a flowchart illustrating a blockchain-based transaction processing method, according to an example implementation.

FIG. 1 shows a blockchain-based transaction processing method according to an implementation of the present application. The method is applied to any node device in a blockchain, and includes the following steps:

Step 102: Receive a target transaction initiated by a member node device in a blockchain, where the target transaction includes a unique identifier of the target transaction.

Step 104: Query whether a preset transaction idempotent table stores a transaction idempotent record corresponding to the unique identifier of the target transaction.

Step 106: Record the target transaction in a candidate block if the transaction idempotent table has not stored the transaction idempotent record corresponding to the unique identifier of the target transaction.

The blockchain described in the present application can include a private blockchain, a public blockchain, a consortium blockchain, etc., and implementations are not limited in the present application.

For example, in a scenario, the blockchain can be a consortium blockchain including the following member devices: a server of a third-party payment platform, a domestic bank server, an overseas bank server, and some user node devices. An operator of the consortium blockchain can deploy consortium blockchain-based online services such as cross-border transfers and asset transfers depending on the consortium blockchain.

The transaction (transfer) described in the present application is data that is created by a user on a client side of a blockchain and finally needs to be published in a distributed database of the blockchain.

Transactions in a blockchain include a transaction in a narrow sense and a transaction in a broad sense. The transaction in a narrow sense is a value transfer published by a user in a blockchain. For example, in a conventional bitcoin blockchain network, the transaction can be a transfer initiated by the user in the blockchain. The transaction in a broad sense is service-oriented service data published by a user in a blockchain. For example, an operator can create a consortium blockchain based on an actual service requirement, and deploy some other types of online services (e.g., a tenancy service, a vehicle scheduling service, an insurance claims service, a credit service, and a medical service) unrelated to a value transfer depending on the consortium blockchain. In such a consortium blockchain, the transaction can be a service-oriented service message or message request published by the user in the consortium blockchain.

The target transaction is a candidate transaction that a node device serving as an accounting node in the blockchain needs to pack and include in the candidate block. The candidate transaction is selected by the node device from collected transactions that are published by another member node device and have been verified.

In the present application, the transaction created by the user on the client side can be signed based on a private key held by the user, and is broadcast in a P2P network of the blockchain by a node device connected to the client side. The node device serving as an accounting node can collect transactions broadcast by another node device, and store the collected transactions in a local transaction pool (also referred to as a memory pool) as unacknowledged transactions.

Further, the node device serving as an accounting node can create a candidate block in a current accounting period, perform validity verification on the transaction in the transaction pool, and then record a verified transaction in the created candidate block as a candidate transaction.

In actual applications, the performing verification on the transaction in the transaction pool can include performing verification on a publisher's identity of the transaction and verification on transaction content. The verification on transaction content can further include integrity verification on the transaction content.

During implementation, when being signed, the transaction can usually be calculated to obtain a content digest (e.g., a hash value), and then the content digest is encrypted based on the held private key to obtain a digital signature. After receiving the signed transaction, the node device serving as an accounting node can decrypt the digital signature based on the private key used to sign the transaction. If the decryption succeeds, it indicates that the publisher's identity of the transaction is verified, and the transaction is a legitimate transaction published by the user.

Next, the node device serving as an accounting node can further recalculate the transaction to obtain a content digest, and match the recalculated content digest and the original content digest obtained by decrypting the digital signature. If the two content digests match each other, it indicates that integrity verification on the transaction content has passed, and the transaction content of the transaction has not been illegally tampered with in a transaction transmission process.

In the specification, in addition to verification on the publisher's identity of the transaction in the transaction pool and verification on the transaction content, it can be further verified whether the transaction in the transaction pool is a valid transaction within a transaction validity period based on a reference time parameter included in the transaction.

The transaction validity period is a validity period that is set by an operator of the blockchain for a transaction published in the blockchain. A transaction within the validity period is considered as a valid transaction that can be added to the candidate block as a legitimate transaction. On the contrary, a transaction that falls beyond the validity period is considered as an invalid transaction that cannot be added to the candidate block.

The transaction validity period can be a time interval that is set by the accounting node device in the blockchain by using a creation time of the candidate block created in the current accounting period as a reference. For example, the transaction validity period can be a period of time before the creation time of the candidate block, or can be a period of time after the creation time of the candidate block. When collecting many transactions published by another node device in the blockchain, the accounting node can determine which transaction can be added to the generated candidate block as a legitimate transaction by using the transaction validity period.

The reference time parameter can be a time parameter that is added to a transaction and is used to determine whether the transaction is a valid transaction within the transaction validity period. When performing verification on the collected transaction, the accounting node in the blockchain can determine whether the transaction is a valid transaction within the transaction validity period based on a time indicated by a reference time parameter included in the transaction.

The reference time parameter can be a physical clock, or can be a logical clock.

The physical clock is a system timestamp that is read from a system or a third-party clock server. The logical clock is a logical timestamp. In a distributed system, any self-increasing value that can indicate an event (e.g., transaction) occurrence order can be used as a logical clock.

In an implementation, for example, the reference time parameter is a physical clock. The reference time parameter can be a reference timestamp added to the transaction. Correspondingly, in this case, the transaction validity period can be a numerical interval formed by a difference (a first value) between a creation timestamp corresponding to the creation time of the candidate block and a first threshold and a sum (a second value) of the creation timestamp of the block and a second threshold.

For example, the creation timestamp of the candidate block is denoted as $B_{ts}$, the first threshold is denoted as K1, and the second threshold is denoted as K2. In this case, the transaction validity period can be represented by a numerical interval $[B_{ts}-K1, B_{ts}+K2]$.

Among them, the first threshold indicates transaction validity duration that is reserved during setting of the transaction validity period. The second threshold indicates a clock offset between a system timestamp of the node device publishing the transaction and a system timestamp of the node device creating the candidate block. In actual applications, a clock offset that can be tolerated in a blockchain network is usually relatively small. Therefore, during setting of the transaction validity period, the second threshold can be set to a threshold that is less than the first threshold in order of magnitude.

For example, the first threshold can be set to five days, and the second threshold can be set to five minutes. In this case, both a transaction published within five days before the creation time of the candidate block and a transaction published within five minutes after the creation time of the candidate block are valid transactions within the transaction validity period.

It is worthwhile to note that the reference timestamp can be manually specified by the user when the user creates the transaction on the client side, or can be automatically added on the client side.

For example, in one situation, when the user creates a transaction on the client side, the client side can read a creation time of the transaction from the system, and then automatically add a timestamp corresponding to the creation time to the created transaction as the reference timestamp. In another situation, the user can specify a time within the transaction validity period as required, and then manually add a timestamp corresponding to the time to the created transaction as the reference timestamp.

Certainly, in actual applications, during setting of the transaction validity period, a clock offset between a system timestamp of the node device publishing the transaction and a system timestamp of the node device creating the candidate block may not be considered. In this case, the transaction validity period can be a numerical interval formed by a difference (a first value) between a creation timestamp corresponding to the creation time of the candidate block and a first threshold and the creation timestamp of the candidate block.

For example, the creation timestamp of the candidate block is denoted as $B_{ts}$, and the first threshold is denoted as K1. In this case, the transaction validity period can be represented by a numerical interval $[B_{ts}-K1, B_{ts}]$.

In another implementation, for example, the reference time parameter is a logical clock. In the P2P network corresponding to the blockchain, a block height of the block in the blockchain can be used as a logical clock. In this case, the reference time parameter can be a reference block height added to the transaction. The transaction validity period can be a numerical interval formed by a block height of the candidate block in the blockchain and a difference (a third value) between the block height of the candidate block in the blockchain and a third threshold.

For example, the block height of the candidate block in the blockchain is denoted as $B_h$, and the third threshold is denoted as K3. In this case, the transaction validity period can be represented by a numerical interval $[B_h-K3, B_h]$.

Like the first threshold, the third threshold indicates transaction validity duration that is reserved during setting of the transaction validity period. When the block height is used as a logical clock to represent the transaction validity period, a clock offset between a system timestamp of the node device publishing the transaction and a system timestamp of the node device creating the candidate block may not be considered. Therefore, an increasing interval of the right part of the previous expression and a threshold representing the clock offset may not be added.

It is worthwhile to note that the reference block height can be manually specified by the user when the user creates the transaction on the client side, or can be automatically added on the client side.

For example, in one situation, when the user creates a transaction on the client side, the client side can read a creation time of the transaction from the system, then further query a maximum block height in the blockchain at the creation time, and automatically add the maximum block height to the created transaction. In another situation, the user can specify a block height within the transaction validity period as required, and then manually add a value corresponding to the block height to the created transaction as the reference block height.

Certainly, in actual applications, another type of increasing value that can be used to describe a transaction occurrence order can be used as the logical clock in addition to the block height of the block in the blockchain. Implementations are not listed in the specification.

In an implementation, assuming that the reference time parameter is a reference timestamp added to the transaction and is denoted as $T_{ts}$, the transaction validity period is a numerical interval $[B_{ts}-K1, B_{ts}+K2]$ formed by the difference between the creation timestamp $B_{ts}$ corresponding to the creation time of the candidate block and the first threshold K1 and the sum of the creation timestamp $B_{ts}$ of the candidate block and the second threshold K2.

In this case, the node device serving as an accounting node can first perform a monotonic increase check on the creation timestamp of the created candidate block, to check whether the creation timestamp $B_{ts}$ of the created candidate block is greater than a creation timestamp of a latest block in the blockchain. If yes, it indicates that the candidate block satisfies a characteristic that creation timestamps of blocks in the blockchain are monotonically increasing, and the candidate block is a legitimate block.

After the candidate block passes the monotonic increase check, the node device serving as an accounting node can further read the timestamp $T_{ts}$ from the transaction, and separately compare the reference timestamp $T_{ts}$ that is read with $B_{ts}-K1$ and $B_{ts}+K2$. If $T_{ts}$ is greater than $B_{ts}-K1$ and less than $B_{ts}+K2$, it can be determined that the transaction is a valid transaction within the transaction validity period.

In an implementation, assuming that the reference time parameter is a reference block height added to the transaction and is denoted as $T_h$, the transaction validity period is a numerical interval $[B_h-K3, B_h]$ formed by the difference between the block height $B_h$ of the candidate block in the blockchain and the third threshold K3 and the block height $B_h$ of the candidate block in the blockchain.

In this case, the node device serving as an accounting node can first perform monotonic increase check on a block number of the created candidate block, to check whether the block number of the created candidate block is greater than a block number of a latest block in the blockchain. If yes, it indicates that the candidate block satisfies a characteristic that block numbers of blocks in the blockchain are monotonically increasing, and the candidate block is a legitimate block.

After the candidate block passes the monotonic increase check, the node device serving as an accounting node can further read the reference block height $T_h$ from the transaction, and separately compare the reference block height $T_h$ that is read with $B_h-K3$ and $B_h$. If $T_h$ is greater than $B_h-K3$ and less than $B_h$, it can be determined that the transaction is a valid transaction within the transaction validity period.

In the present application, a transaction in the transaction pool that succeeds in verification on the publisher's identity, verification on the transaction content, validity verification of the transaction, etc. can be used as a candidate transaction, packed and included in the created candidate block.

For example, the node device serving as an accounting node can add transactions that succeed in validity verification to the candidate block, or select some of the transactions that succeed in validity verification based on a rule (e.g., based on transaction priorities), and add the transactions to the candidate block.

Therefore, only a valid transaction within the transaction validity period can be recorded in the candidate block as a legitimate transaction. Some overdue transactions prior to a long period of time cannot be recorded in the candidate block for subsequent transaction execution. As such, an illegitimate node device in the blockchain cannot initiate a replay attack in the blockchain by using an intercepted overdue transaction prior to a long period of time, thereby increasing a transaction security level of the blockchain.

In the specification, a transaction execution environment of the node device serving as an accounting node can be a multi-instance execution environment, and in the multi-instance execution environment, the same transaction can be repeatedly submitted by different instances. Therefore, idempotence can occur during transaction execution in the blockchain. The idempotence means that a user is adversely affected after the same transaction is repeatedly executed.

For example, a "double spending" problem in a bitcoin network is a typical "idempotence" problem. Assume that a transfer transaction is intercepted by an illegitimate node after signature verification performed by using a private key of a user succeeds. After the transaction is executed, the illegitimate node can initiate a replay attack based on the intercepted transaction, and repeatedly execute the transaction in the blockchain, causing the same capital to be transferred for a plurality of times and causing financial losses to the user.

Therefore, to reduce repeated execution of a transaction in a multi-instance execution environment, node devices that can serve as accounting nodes in the blockchain can jointly maintain a transaction idempotent table.

For example, the node devices serving as accounting nodes can jointly maintain a transaction idempotent table passing consensus by using an existing consensus mechanism in the blockchain.

The transaction idempotent table is an index record table created for storage records (namely, block records) that are successfully recorded in the distributed database of the blockchain based on a valid transaction within the transaction validity period. The transaction idempotent table is used to store transaction idempotent records corresponding to valid transactions that are successfully recorded in the distributed database of the blockchain.

To be specific, the transaction idempotent record stored in the transaction idempotent table is used to indicate that a transaction corresponding to the transaction idempotent record has been successfully encapsulated into a candidate block, and the candidate block has passed consensus to be successfully added to the distributed database (namely, a distributed ledger) of the blockchain as a latest block in the blockchain.

Before recording a valid transaction in the candidate block, the node device serving as an accounting node can perform idempotence check on the transaction based on the transaction idempotent table, to determine whether the transaction is a transaction that has been successfully recorded in the database of the blockchain.

In an implementation, the transaction created by the user on the client side can include a unique identifier created on the client side for the transaction, in addition to the previous reference time parameter.

Unique identifiers created on the client side for transactions can be monotonically increasing transaction identifiers. A specific form of the transaction identifier is not limited in the specification.

In an implementation, the unique identifiers of the transactions that are included in the transactions can be unique monotonically increasing transaction numbers that are created on the client side for the transactions.

For example, in actual applications, the node device in the blockchain can be a node device configured with a plurality of instances, and each instance has a unique instance ID. In this case, the transaction number can be a unique transaction number that includes an instance ID and a generated random number.

For another example, the node device in the blockchain is a distributed device that includes a plurality of devices, and each device has a unique device identifier (e.g., a device ID or an IP address of the device). In this case, the transaction number can be a unique transaction number that includes a device identifier and a generated random number.

Certainly, the transaction number generation method described in the previous example is only an example. A person skilled in the art can also flexibly use other transaction number generation methods during implementation of the technical solutions in the present application. The other transaction number generation methods are not listed in the present application.

In another implementation, the unique identifiers of the transactions that are included in the transactions can be unique monotonically increasing nonce values that are added on the client side to the generated transactions.

The nonce value can be a monotonically increasing random or pseudo-random number that is added to a transaction and can be used by one transaction only once.

A conventional Ethereum (Ethereum) blockchain platform is used as an example. In Ethereum, an initial nonce value is configured for each account object, and the nonce value is counted from 0. The nonce value is correspondingly increased by 1 each time the account object sends a transaction, and each transaction sent by the account object includes a current nonce value of the account object (namely, a nonce value of the account object during creation of the transaction). After receiving a transaction, the node device serving as an accounting node can strictly execute the transaction from a user based on a counting order of nonce values. A nonce value included in the transaction can be checked to determine whether the nonce value is greater than a nonce value used in a transaction previously sent by the account object. If the nonce value included in the transaction is less than a maximum nonce value previously used by a transaction of the account object, it indicates that the transaction is a duplicate transaction and is directly rejected. If the nonce value included in the transaction is far greater than a maximum nonce value previously used by a transaction of the account object, the transaction can be processed and is recorded in the candidate block only after a transaction corresponding to a nonce value preceding the nonce value included in the transaction is processed. Correspondingly, if the nonce value included in the transaction coincides with a next count value of a maximum nonce value used by a transaction of the account object, the transaction can be processed immediately, and the transaction is recorded in the candidate block. In the present application, the unique identifier of the transaction that is included in the transaction can be a nonce value in Ethernet, and details are omitted in the present application.

After determining that a transaction collected is a valid transaction within the transaction validity period, the node device serving as an accounting node can further query whether a transaction idempotence record corresponding to a unique identifier of the transaction is stored in the transaction idempotence table.

If the transaction idempotence record has stored the transaction idempotence record corresponding to the unique identifier of the transaction, it indicates that the transaction has been successfully recorded in the distributed database of the blockchain, the transaction is a duplicate transaction, and the transaction can be directly discarded.

In addition, if the transaction idempotent table has not stored the transaction idempotent record corresponding to the unique identifier of the transaction, it indicates that the transaction has not been successfully recorded in the distributed database of the blockchain, and the node device can record the transaction in the candidate block.

In the present application, after generating the candidate block, the node device serving as an accounting node can further broadcast the generated candidate block in the blockchain, and perform consensus processing on a transaction recorded in the candidate block in the blockchain based on a consensus algorithm supported by the blockchain, to contend for accounting permission.

A specific type of the consensus algorithm supported by the blockchain is not limited in the present application. In actual applications, a standard consensus algorithm such as a proof-of-work algorithm or a PBFT algorithm can be used, or the consensus algorithm can be customized by an operator of the blockchain based on an actual service requirement.

After the candidate block has passed consensus, and the node device serving as an accounting node obtains the accounting permission, the following can be implemented.

The candidate block can be added to the distributed database (namely, the distributed ledger) of the blockchain as a latest block in the blockchain. In this case, the candidate block is permanently stored in the blockchain as a block in the blockchain.

In addition, the node device can trigger a transaction passing consensus that is recorded in the candidate block to be executed in the transaction execution environment of the node device based on transaction content included in the transaction. For example, the transaction can be used as input of a smart contract that has been published in the blockchain, and the transaction is executed in the transaction execution environment of the node device by executing transaction execution program code (e.g., calling some functions related to transaction execution) stated in the smart contract.

In an implementation, after the target transaction is successfully recorded in the candidate block, and the candidate block has passed consensus to be finally stored in the distributed database of the blockchain as a latest block in the blockchain, the target transaction has been successfully stored in the distributed database of the blockchain (in other words, the transaction is successfully onchain). In this case, the node device serving as an accounting node can further generate the transaction idempotence record corresponding to the unique identifier of the target transaction, and then insert the transaction idempotence record into the transaction idempotence table.

A specific format of the transaction idempotent record is not limited in the present application.

In an implementation, the unique identifier of the transaction can be directly inserted into the transaction idempotent table as the transaction idempotent record, to prevent the transaction idempotent record from occupying relatively large storage space. Certainly, in actual applications, the transaction idempotent record can be a data record that includes the unique identifier of the transaction. The following implementation is described by using an example that the transaction idempotence record in the transaction idempotence table is the unique identifier of the transaction.

The transaction idempotence record in the transaction idempotence table includes only transaction idempotence records of valid transactions within the transaction validity period, and a transaction idempotence record of a historical transaction before the transaction validity period does not need to be stored. Therefore, storage space consumption of the transaction idempotence table is not excessively large, and no query performance problem exists because storage space consumption of the transaction idempotence table is excessively large.

For example, for any node device that can serve as an accounting node, because storage space occupied by the transaction idempotence table is relatively small, the transaction idempotence table can be directly loaded and maintained in a device memory, and the transaction idempotence table does not need to be stored by using a third-party storage disk. Therefore, a query in the transaction idempotence table can be directly performed in the memory, and query performance can be significantly improved.

In addition, among valid transactions, only a transaction whose transaction idempotent record does not exist in the transaction idempotence table can be successfully recorded in the candidate block. Therefore, "idempotence" problems occurring during transaction execution in the blockchain can be reduced, and an illegitimate node cannot initiate a replay attack by using an intercepted valid transaction within the transaction validity period. As such, the same valid transaction cannot be repeatedly executed.

In addition, when a plurality of instances are configured for the node device in the blockchain, or the node device is a distributed device, the following problems can be effectively reduced: The same valid transaction is repeatedly executed because the same valid transaction is published in parallel by different instances or different subdevices in the distributed device.

In an implementation, because transaction identifiers recorded in the transaction idempotence table are monotonically increasing transaction identifiers with consecutive values, in a process of inserting the transaction idempotence record into the transaction idempotence table, a plurality of recorded monotonically increasing transaction identifiers with consecutive values can be combined to further reduce storage space occupied by the transaction idempotence table.

Specifically, when inserting the transaction identifier of the target transaction into the transaction idempotent table as a transaction idempotent record, the node device serving as an accounting node can determine whether the transaction idempotent table includes a plurality of monotonically increasing transaction identifiers with consecutive values after the transaction identifier of the target transaction is inserted into the transaction idempotent table. If yes, the node device can record the plurality of monotonically increasing transaction identifiers with consecutive values in the transaction idempotent table in the form of an interval. If no, the node device can record the transaction identifier of the target transaction in the transaction idempotent table in the form of a discrete value.

For example, the transaction identifier of the target transaction is a nonce value. Assume that a nonce value included in the target transaction is 2, and nonce values 1, 3, and 5 have been recorded in the transaction idempotence table. In this case, after the nonce value 2 included in the target transaction is inserted into the transaction idempotence table as a transaction idempotence record, the nonce value 2 and the nonce values 1 and 3 that have been recorded in the transaction idempotence table are monotonically increasing consecutive values. Therefore, the nonce values 1, 2, and 3 can be recorded in the transaction idempotence table in the form of an interval [1, 3]. Alternatively, a maximum value of the interval can be used to represent the interval, and the interval [1, 3] is represented as 3 to record the nonce values in the transaction idempotence table, to further save storage space of the transaction idempotence record.

For another example, a nonce value included in the target transaction is 9, and nonce values [1, 3] and 5 have been recorded in the transaction idempotence table. After the nonce value 9 included in the target transaction is inserted into the transaction idempotence table as a transaction idempotence record, the transaction idempotent table does not include a plurality of monotonically increasing consecutive nonce values. In this case, the nonce value 9 can be recorded in the transaction idempotence table in the form of a discrete value. In this case, nonce values in an updated transaction idempotence table are [1, 3], 5, and 9.

As such, a plurality of monotonically increasing transaction identifiers with consecutive values can be recorded in the transaction idempotence table in the form of an interval. It can significantly reduce occupation of storage space of the transaction idempotence table in a large-scale transaction processing scenario.

Certainly, in the process of inserting a transaction idempotence record into the transaction idempotence table, a plurality of monotonically increasing transaction identifiers with consecutive values in the transaction idempotent table are combined. In actual applications, the described combination process can be periodically completed based on a preset combination period. For example, whether the transaction idempotent table includes a plurality of monotonically increasing transaction identifiers with consecutive values is periodically checked based on the preset combination period. If yes, the plurality of monotonically increasing transaction identifiers with consecutive values can be recorded in the transaction idempotent table in the form of an interval.

In the present application, after generating the candidate block, the node device serving as an accounting node can further broadcast the generated candidate block in the blockchain, and perform consensus processing on a transaction recorded in the candidate block in the blockchain based on a consensus algorithm supported by the blockchain, to contend for accounting permission.

A specific type of the consensus algorithm supported by the blockchain is not limited in the present application. In actual applications, a standard consensus algorithm such as a proof-of-work algorithm or a PBFT algorithm can be used, or the consensus algorithm can be customized by an operator of the blockchain based on an actual service requirement.

After the candidate block has passed consensus, and the node device serving as an accounting node obtains the accounting permission, the following can be implemented.

The candidate block can be added to the distributed database (namely, the distributed ledger) of the blockchain as a latest block in the blockchain. In this case, the candidate block is permanently stored in the blockchain as a block in the blockchain.

In addition, the node device can trigger a transaction passing consensus that is recorded in the candidate block to be executed in the transaction execution environment of the node device based on transaction content included in the transaction. For example, the transaction can be used as input of a smart contract that has been published in the blockchain, and the transaction is executed in the transaction execution environment of the node device by executing transaction execution program code (e.g., calling some functions related to transaction execution) stated in the smart contract.

In an implementation, after the target transaction is successfully recorded in the candidate block, and the candidate block has passed consensus to be finally stored in the distributed database of the blockchain as a latest block in the blockchain, the target transaction has been successfully stored in the distributed database of the blockchain (in other words, the transaction is successfully onchain). In this case, the node device serving as an accounting node can further generate the transaction idempotence record corresponding to the unique identifier of the target transaction, and then insert the transaction idempotence record into the transaction idempotence table.

In the present application, the transaction idempotence table is used to maintain a transaction idempotence record corresponding to a valid transaction within the transaction validity period. Therefore, in actual applications, member node devices that jointly maintain the transaction idempotent table can periodically clear away a transaction idempotent record of a transaction that falls beyond the transaction validity period in the transaction idempotent table in time.

For example, the transaction validity period is a time interval that is set by the accounting node device in the blockchain by using the creation time of the candidate block created in the current accounting period as a reference. Because candidate blocks are created periodically, the transaction validity period is also a periodic dynamic time period. In this case, the node device can determine a transaction validity period again when a new candidate block is created in the next accounting period, and then actively search the transaction idempotent table for a transaction idempotent record of a transaction that falls beyond the transaction validity period that is determined again. For example, it can be determined whether the transaction falls beyond the transaction validity period that is determined again still by using the reference time parameter in the transaction. A specific implementation process is omitted.

Further, these identified transaction idempotence record can be deleted to dynamically update and maintain transaction idempotence records maintained in the transaction idempotence table. As such, transaction idempotence records in the transaction idempotence table are transaction idempotence records corresponding to valid transactions within the current transaction validity period.

Figure 2:
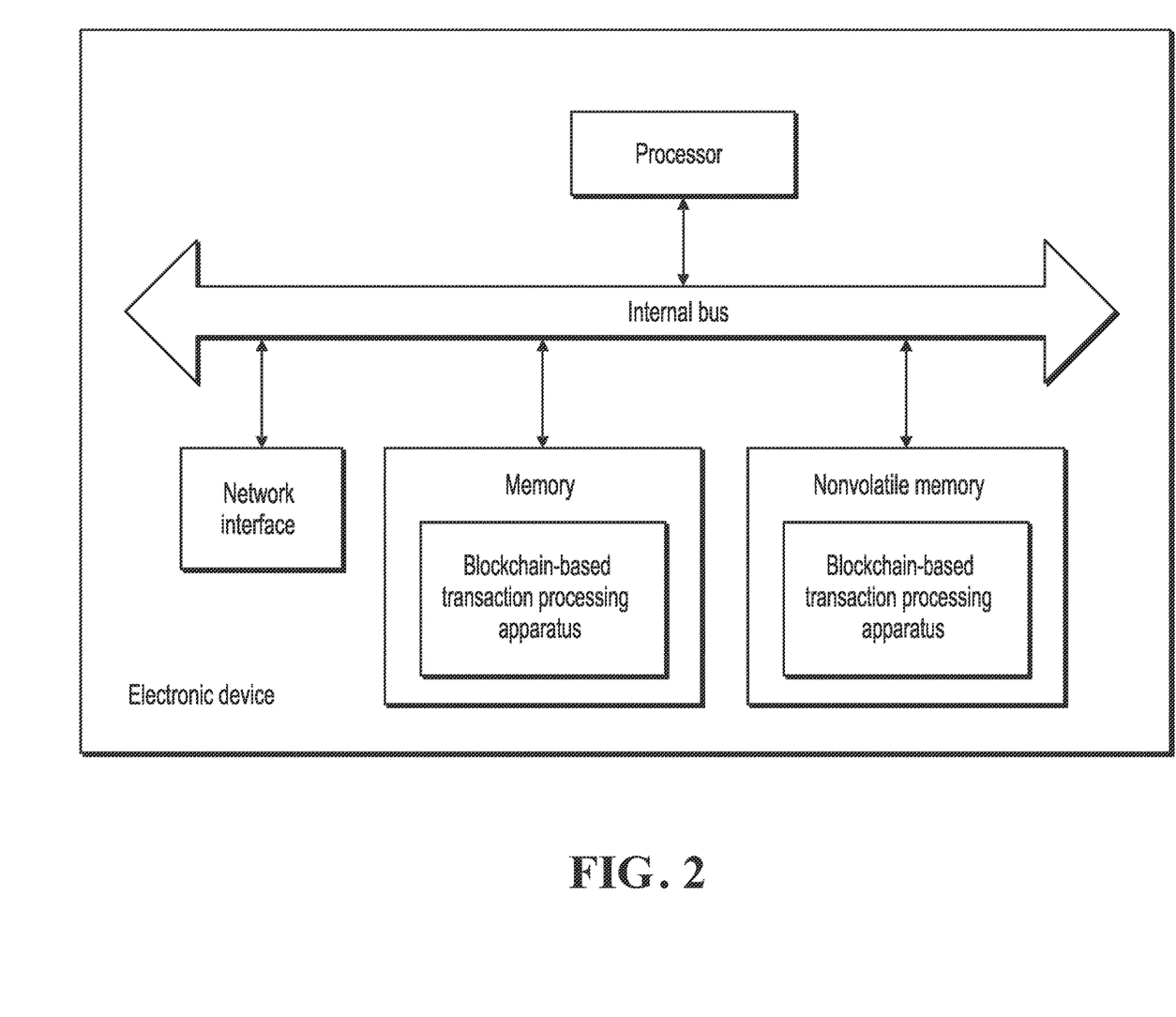
FIG. 2 is a structural diagram illustrating an electronic device, according to an example implementation.

The present application further provides an implementation of a blockchain-based transaction processing apparatus corresponding to the foregoing method implementation. The implementation of the blockchain-based transaction processing apparatus in the present application can be applied to an electronic device. The apparatus implementation can be implemented by software, hardware, or a combination of hardware and software. Software implementation is used as an example. A processor of the electronic device where the apparatus is located reads a corresponding computer program instruction from a nonvolatile memory to a memory, and the computer program instruction runs to form the logical apparatus. In terms of hardware implementation, FIG. 2 is a structural diagram illustrating hardware of the electronic device where the blockchain-based transaction processing apparatus is located according to the present application. In addition to the processor, the memory, the network interface, and the nonvolatile memory shown in FIG. 2, the electronic device where the apparatus is located in this implementation can usually include other hardware based on an actual function of the electronic device. Details are omitted.

Figure 3:
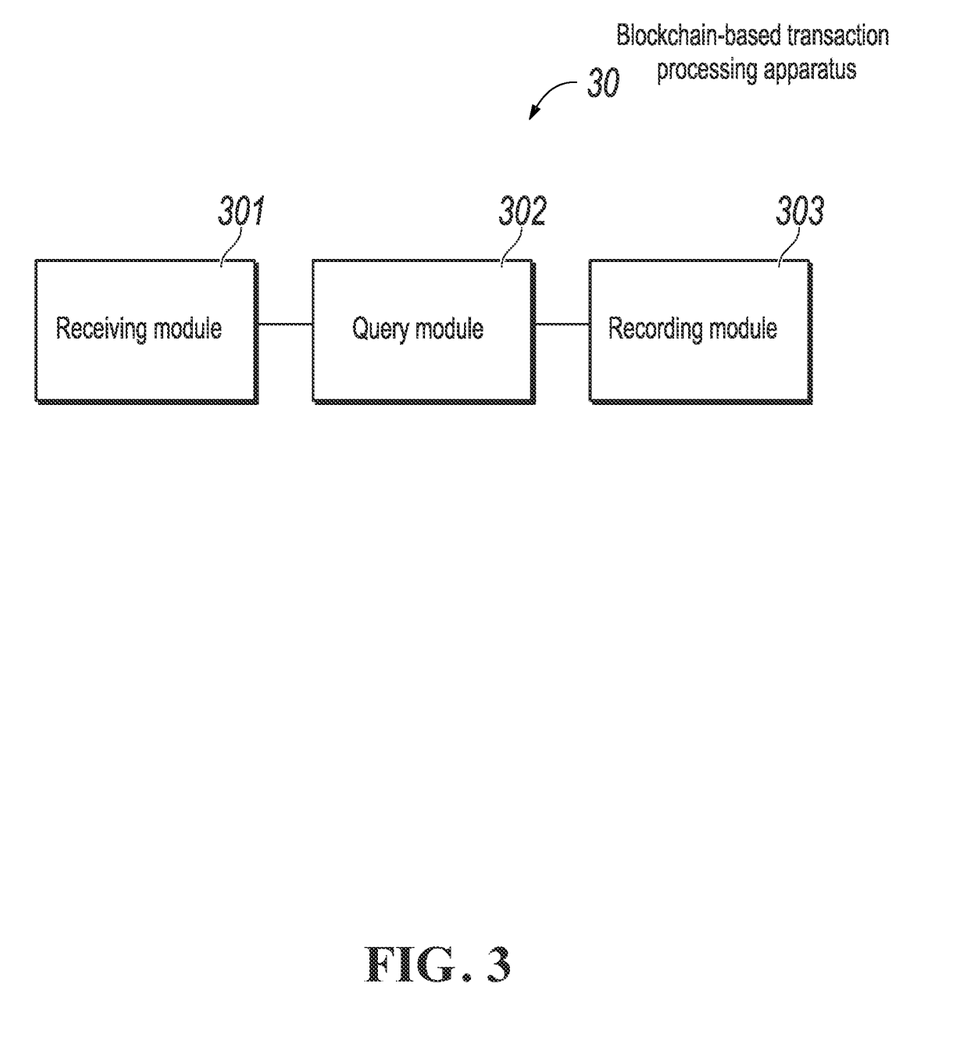
FIG. 3 is a block diagram illustrating a blockchain-based transaction processing apparatus, according to an example implementation.

FIG. 3 is a block diagram illustrating a blockchain-based transaction processing apparatus, according to an example implementation of the present application.

Referring to FIG. 3, the blockchain-based transaction processing apparatus 30 can be applied to the electronic device shown in FIG. 2, and includes a receiving module 301, a query module 302, and a recording module 303.

The receiving module 301 is configured to receive a target transaction initiated by a member node device in a blockchain, where the target transaction includes a unique identifier of the target transaction.

The query module 302 is configured to query whether a preset transaction idempotent table stores a transaction idempotent record corresponding to the unique identifier of the target transaction.

The recording module 303 is configured to record the target transaction in a candidate block if the transaction idempotent table has not stored the transaction idempotent record corresponding to the unique identifier of the target transaction.

In this implementation, a transaction idempotent record in the transaction idempotent table indicates that a transaction corresponding to the transaction idempotent record has been successfully recorded in a distributed database of the blockchain.

In this implementation, the recording module 303 is further configured to: if the target transaction is recorded in the candidate blocks, and the candidate block has passed consensus to be successfully stored in the distributed database of the blockchain, generate the transaction idempotent record corresponding to the unique identifier of the target transaction, and insert the generated transaction idempotent record corresponding to the unique identifier of the target transaction into the transaction idempotent table.

In this implementation, a transaction idempotent record in the transaction idempotent table is a unique identifier of a transaction, and unique identifiers of transactions initiated by member node devices in the blockchain are monotonically increasing transaction identifiers.

The recording module 303 is further configured to determine whether the transaction idempotent table includes a plurality of monotonically increasing transaction identifiers with consecutive values after the unique identifier of the transaction is inserted into the transaction idempotent table; and if yes, record the plurality of monotonically increasing transaction identifiers with consecutive values in the transaction idempotent table in the form of an interval; or if no, record the transaction identifier of the transaction in the transaction idempotent table in the form of a discrete value.

In this implementation, the target transaction further includes a reference time parameter, and the reference time parameter is used to determine whether the target transaction is a valid transaction within a transaction validity period.

The apparatus 30 further includes the following: a determining module 304 (not shown in FIG. 3), configured to determine whether the target transaction is a valid transaction within the transaction validity period based on the reference time parameter before it is queried whether the preset transaction idempotent table stores the transaction idempotent record corresponding to the unique identifier of the target transaction; and further query whether the preset transaction idempotent table stores the transaction idempotent record corresponding to the unique identifier of the target transaction if it is determined that the target transaction is a valid transaction within the transaction validity period.

In this implementation, the blockchain is a consortium blockchain. For an implementation process of functions and roles of each module in the apparatus, refer to an implementation process of a corresponding step in the previous method. Details are not omitted here.

Because the apparatus implementation basically corresponds to the method implementation, for related parts, references can be made to related descriptions in the method implementation. The previously described apparatus implementation is merely an example. The modules described as separate parts may or may not be physically separate, and parts displayed as modules may or may not be physical modules, and can be located in one position, or can be distributed on a plurality of network modules. Some or all of the modules can be selected based on actual needs to achieve the objectives of the solutions in the present application. A person of ordinary skill in the art can understand and implement the implementations of the present application without creative efforts.

The system, apparatus, or module illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet, a wearable device, or any combination of these devices.

The present application further provides an implementation of an electronic device corresponding to the previous method implementation. The electronic device includes a processor and a memory configured to store a machine executable instruction. The processor and the memory are usually connected to each other by using an internal bus. In another possible implementation, the device can further include an external interface, so that the device can communicate with another device or component.

In this implementation, by reading and executing the machine executable instruction that is stored in the memory and corresponds to control logic of blockchain-based transaction processing, the processor is configured to receive a target transaction initiated by a member node device in a blockchain, where the target transaction includes a unique identifier of the target transaction; query whether a preset transaction idempotent table stores a transaction idempotent record corresponding to the unique identifier of the target transaction; and record the target transaction in a candidate block if the transaction idempotent table has not stored the transaction idempotent record corresponding to the unique identifier of the target transaction.

In this implementation, by reading and executing the machine executable instruction that is stored in the memory and corresponds to control logic of blockchain-based transaction processing, the processor is configured to: if the target transaction is recorded in the candidate blocks, and the candidate block has passed consensus to be successfully stored in a distributed database of the blockchain, generate the transaction idempotent record corresponding to the unique identifier of the target transaction, and insert the generated transaction idempotent record corresponding to the unique identifier of the target transaction into the transaction idempotent table.

In this implementation, a transaction idempotent record in the transaction idempotent table is a unique identifier of a transaction, and unique identifiers of transactions initiated by member node devices in the blockchain are monotonically increasing transaction identifiers.

By reading and executing the machine executable instruction that is stored in the memory and corresponds to control logic of blockchain-based transaction processing, the processor is configured to determine whether the transaction idempotent table includes a plurality of monotonically increasing transaction identifiers with consecutive values after the unique identifier of the transaction is inserted into the transaction idempotent table; and if yes, record the plurality of monotonically increasing transaction identifiers with consecutive values in the transaction idempotent table in the form of an interval; or if no, record the transaction identifier of the transaction in the transaction idempotent table in the form of a discrete value.

In this implementation, the target transaction further includes a reference time parameter, and the reference time parameter is used to determine whether the target transaction is a valid transaction within a transaction validity period.

By reading and executing the machine executable instruction that is stored in the memory and corresponds to control logic of blockchain-based transaction processing, the processor is configured to determine whether the target transaction is a valid transaction within the transaction validity period based on the reference time parameter before it is queried whether the preset transaction idempotent table stores the transaction idempotent record corresponding to the unique identifier of the target transaction; and further query whether the preset transaction idempotent table stores the transaction idempotent record corresponding to the unique identifier of the target transaction if it is determined that the target transaction is a valid transaction within the transaction validity period.

A person skilled in the art can easily figure out another implementation of the present application after thinking over the present application and practicing the present disclosure here. The present application is intended to cover any variations, uses, or adaptations of the present application, and these variations, uses, or adaptations follow the general principles of the present application and include common knowledge or conventional techniques that are not disclosed in the technical field of the present application. The specification and the implementations are merely considered as examples, and the actual scope and spirit of the present application are pointed out by the following claims.

It should be understood that the present application is not limited to the precise structures that have been described above and shown in the accompanying drawings, and various modifications and changes can be made without departing from the scope of the present application. The scope of the present application is limited by the appended claims only.

The previous descriptions are merely preferred implementations of the present application, but are not intended to limit the present application. Any modification, equivalent replacement, or improvement made without departing from the spirit and principle of the present application shall fall within the protection scope of the present application.

Figure 4:
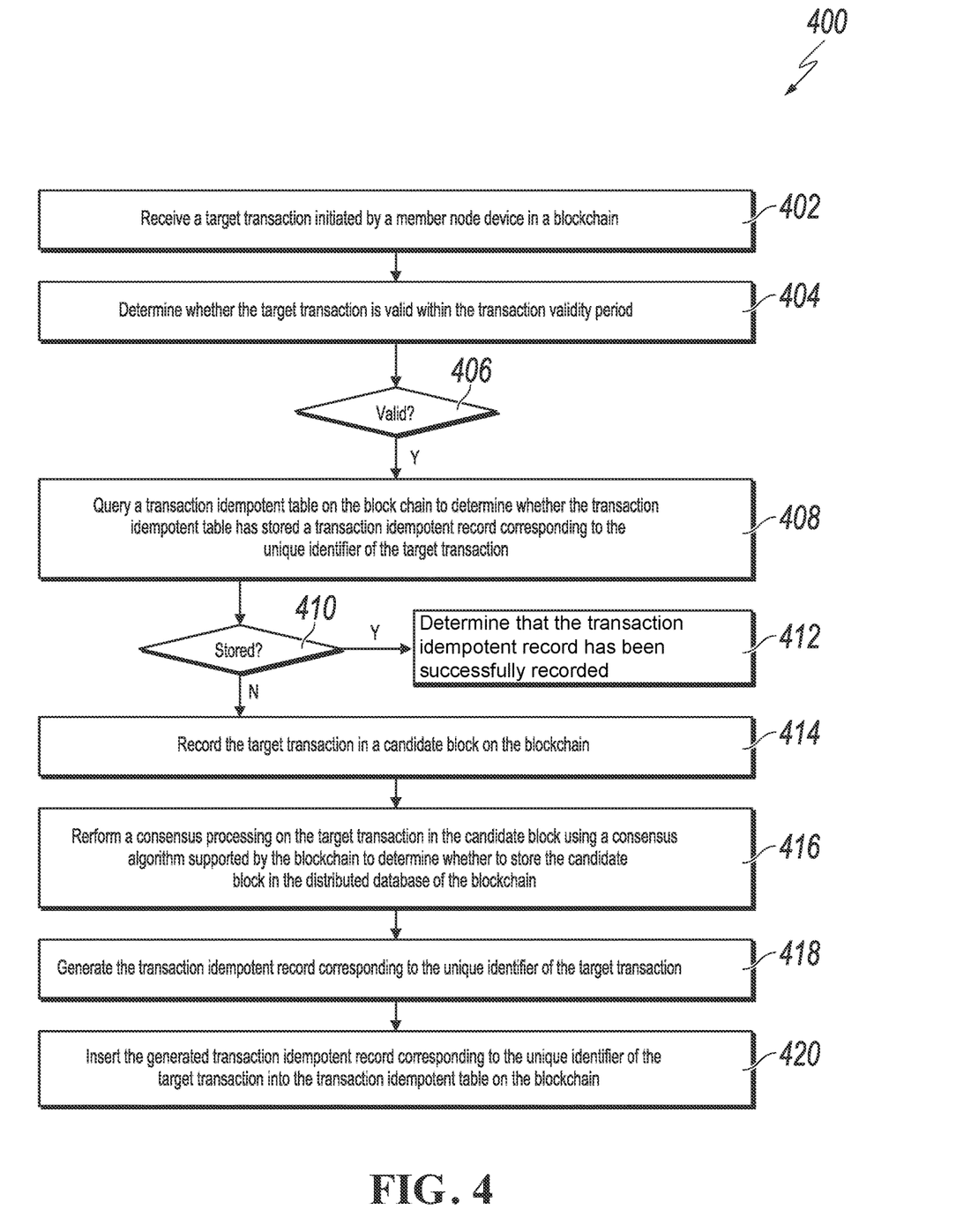
FIG. 4 is a flowchart illustrating an example of a computer-implemented method for processing blockchain-based transactions, according to an implementation of the present disclosure.

In the above context, FIG. 4 is a flowchart illustrating an example of a computer-implemented method 400 for processing blockchain-based transactions, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a blockchain receives a target transaction initiated by a member bode device. The target transaction can include a unique identifier of the target transaction. In one example, the unique identifier corresponds to a nonce value. The target transaction can further include a reference time parameter. In one example, the reference time parameter includes a time stamp. From 402, method 400 proceeds to 404.

At 404, the method proceeds to determine whether the target transaction is valid within the transaction validity period. For context, target transactions may be initiated by member node device on the blockchain in a successive manner. Each target transaction has a finite validity period. For example, the reference time parameter of the target transaction can be verified to determine whether the target transaction is within the transaction validity period based on the reference time parameter. In one example, the transaction validity period corresponds to a time window characterized by an expiration period of a blockchain transaction on the blockchain, or a clock offset for devices on the blockchain. In response to determining that the target transaction is within a validity time period (406), method 400 proceeds to 408. Otherwise, the target transaction may be dropped.

At 408, method 400 proceeds to query a transaction idempotent table on the block chain to determine whether the transaction idempotent table has stored a transaction idempotent record corresponding to the unique identifier of the target transaction. The transaction idempotent record stored in the transaction idempotent table indicates that a transaction corresponding to the transaction idempotent record has been successfully recorded in a distributed database of the blockchain. The transaction idempotent record shows a transaction record that can be applied multiple times without changing the result beyond the initial application. At 408, a determination is made as to whether the transaction idempotent table has stored a transaction idempotent record corresponding to the unique identifier of the target transaction. From 408, method 400 proceeds to 410

At 410, a determination is made as to whether the transaction idempotent table has stored a transaction idempotent record corresponding to the unique identifier of the target transaction. In response to determining that the transaction idempotent table has stored a transaction idempotent record corresponding to the unique identifier of the target transaction, method 400 proceeds to 412 to determine that the target transaction has been successfully recorded. In response to determining that the transaction idempotent table has stored a transaction idempotent record corresponding to the unique identifier of the target transaction, method 400 proceeds to 414 to record the target transaction in a candidate block on the blockchain. From 414, method 400 proceeds to 416.

At 416, method 400 proceeds to perform a consensus processing on the target transaction in the candidate block using a consensus algorithm supported by the blockchain to determine whether to store the candidate block in the distributed database of the blockchain. In response to the candidate block having passed the consensus processing, method 400 proceeds to generate the transaction idempotent record corresponding to the unique identifier of the target transaction (418). Subsequently, method 400 proceeds to insert the generated transaction idempotent record corresponding to the unique identifier of the target transaction into the transaction idempotent table on the blockchain (420).

Implementations disclosed in the present specification provide technical solutions for handling blockchain transactions. In one aspect, a transaction idempotent table is created to enforce idempotent processing on a received transaction in a blockchain. Idempotent processing can be applied multiple times without changing the result beyond the initial application. As such, an illegitimate node cannot initiate a replay attack by using an intercepted overdue transaction. In another aspect, target transactions are initiated on a blockchain based on a time stamp. Timely processing of the target transactions are expected to occur within a validity time period. By enforcing a time window for each target transaction, an accounting node can discern the timeliness of a target transaction so that target transactions outside the validity time window may be treated as illegitimate, such as a replay.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing blockchain-based transactions, the computer-implemented method comprising:
   receiving, by a first member node device in a blockchain, a target transaction initiated by a second member node device in the blockchain, wherein the target transaction comprises a block height of a candidate block on the blockchain defining a creation time stamp of a logical clock;
   determining that the target transaction is valid by determining that the target transaction is authorized to be performed within a transaction validity period based on an identifier of the target transaction comprising a nonce value that is increasing relative to nonce values of previously recorded transaction identifiers and coincides with a current maximum nonce value, wherein the transaction validity period enables differentiation of overdue transactions from valid transactions and is based on a difference between the block height of the candidate block and a threshold;
   querying, by the first member node device in the blockchain, a transaction idempotent table on the blockchain using the identifier of the target transaction;
   in response to querying, determining an inexistence of a potential duplicate corresponding to the identifier of the target transaction in the transaction idempotent table, the transaction idempotent table being jointly maintained by a plurality of member node devices in the blockchain by using a consensus mechanism established between the plurality of member node devices in the blockchain and being configured to store one or more combined transaction identifiers and one or more individual transaction identifiers, each of the one or more combined transaction identifiers being combined to minimize storage of records of transactions;
   in response to determining, the inexistence of the potential duplicate in the transaction idempotent table, recording, by the first member node device in the blockchain, the target transaction in the candidate block on the blockchain;
   performing a consensus processing on the target transaction in the candidate block using a consensus algorithm supported by the blockchain;
   inserting a transaction idempotent record corresponding to the identifier of the target transaction into the transaction idempotent table on the blockchain; and
   executing, by an transaction execution environment of the first member node device, the target transaction by using a transaction execution program code.

2. The computer-implemented method of claim 1, further comprising:
   determining that a plurality of monotonically increasing transaction identifiers have consecutive values after the identifier of the target transaction is inserted into the transaction idempotent table; and
   in response to determining that the plurality of monotonically increasing transaction identifiers have consecutive values after the identifier of the target transaction is inserted into the transaction idempotent table, recording the plurality of monotonically increasing transaction identifiers with consecutive values in the transaction idempotent table based on an interval.

3. The computer-implemented method of claim 1, wherein the target transaction further comprises a reference time parameter based on a time stamp to assist determining that the target transaction is a valid transaction within a transaction validity period.

4. The computer-implemented method of claim 3, further comprising:
   prior to determining that the transaction idempotent table stores the transaction idempotent record corresponding to the identifier of the target transaction, determining that the target transaction is the valid transaction within the transaction validity period based on the reference time parameter; and
   in response to determining that the target transaction is the valid transaction within the transaction validity period, determining that the transaction idempotent table stores the transaction idempotent record corresponding to the identifier of the target transaction.

5. The computer-implemented method of claim 4, wherein determining that the target transaction is the valid transaction within the transaction validity period comprises:
   determining that the target transaction occurs within a time window of the time stamp from the reference time parameter, wherein the time window is characterized by at least one of: a duration time for a blockchain transaction on the blockchain and a clock offset time for devices on the blockchain.

6. A non-transitory, computer-readable medium storing one or more instructions executable by a computer system to perform operations comprising:
   receiving, by a first member node device in a blockchain, a target transaction initiated by a second member node device in the blockchain, wherein the target transaction comprises a block height of a candidate block on the blockchain defining a creation time stamp of a logical clock;

determining that the target transaction is valid by determining that the target transaction is authorized to be performed within a transaction validity period based on an identifier of the target transaction comprising a nonce value that is increasing relative to nonce values of previously recorded transaction identifiers and coincides with a current maximum nonce value, wherein the transaction validity period enables differentiation of overdue transactions from valid transactions and is based on a difference between the block height of the candidate block and a threshold;

querying, by the first member node device in the blockchain, a transaction idempotent table on the blockchain using the identifier of the target transaction;

in response to querying, determining an inexistence of a potential duplicate corresponding to the identifier of the target transaction in the transaction idempotent table, the transaction idempotent table being jointly maintained by a plurality of member node devices in the blockchain by using a consensus mechanism established between the plurality of member node devices in the blockchain and being configured to store one or more combined transaction identifiers and one or more individual transaction identifiers, each of the one or more combined transaction identifiers being combined to minimize storage of records of transactions;

in response to determining, the inexistence of the potential duplicate in the transaction idempotent table, recording, by the first member node device in the blockchain, the target transaction in the candidate block on the blockchain;

performing a consensus processing on the target transaction in the candidate block using a consensus algorithm supported by the blockchain;

inserting a transaction idempotent record corresponding to the identifier of the target transaction into the transaction idempotent table on the blockchain; and executing, by an transaction execution environment of the first member node device, the target transaction by using a transaction execution program code.

7. The non-transitory, computer-readable medium of claim 6, wherein the operations further comprise:

determining that a plurality of monotonically increasing transaction identifiers have consecutive values after the identifier of the target transaction is inserted into the transaction idempotent table; and in response to determining that the plurality of monotonically increasing transaction identifiers have consecutive values after the identifier of the target transaction is inserted into the transaction idempotent table, recording the plurality of monotonically increasing transaction identifiers with consecutive values in the transaction idempotent table based on an interval.

8. The non-transitory, computer-readable medium of claim 6, wherein the target transaction further comprises a reference time parameter based on a time stamp to assist determining that the target transaction is a valid transaction within a transaction validity period.

9. The non-transitory, computer-readable medium of claim 8, wherein the operations further comprise:

prior to querying determining that the transaction idempotent table stores the transaction idempotent record corresponding to the identifier of the target transaction, determining that the target transaction is the valid transaction within the transaction validity period based on the reference time parameter; and in response to determining that the target transaction is the valid transaction within the transaction validity period, determining that the transaction idempotent table stores the transaction idempotent record corresponding to the identifier of the target transaction.

10. The non-transitory, computer-readable medium of claim 9, wherein determining that the target transaction is the valid transaction within the transaction validity period comprises:

determining that the target transaction occurs within a time window of the time stamp from the reference time parameter, wherein the time window is characterized by at least one of: a duration time for a blockchain transaction on the blockchain and a clock offset time for devices on the blockchain.

11. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, by a first member node device in a blockchain, a target transaction initiated by a second member node device in the blockchain, wherein the target transaction comprises a block height of a candidate block on the blockchain defining a creation time stamp of a logical clock;

determining that the target transaction is valid by determining that the target transaction is authorized to be performed within a transaction validity period based on an identifier of the target transaction comprising a nonce value that is increasing relative to nonce values of previously recorded transaction identifiers and coincides with a current maximum nonce value, wherein the transaction validity period enables differentiation of overdue transactions from valid transactions and is based on a difference between the block height of the candidate block and a threshold;

querying, by the first member node device in the blockchain, a transaction idempotent table on the blockchain using the identifier of the target transaction;

in response to querying, determining an inexistence of a potential duplicate corresponding to the identifier of the target transaction in the transaction idempotent table, the transaction idempotent table being jointly maintained by a plurality of member node devices in the blockchain by using a consensus mechanism established between the plurality of member node devices in the blockchain and being configured to store one or more combined transaction identifiers and one or more individual transaction identifiers, each of the one or more combined transaction identifiers being combined to minimize storage of records of transactions;

in response to determining, the inexistence of the potential duplicate in the transaction idempotent table, recording, by the first member node device in the blockchain, the target transaction in the candidate block on the blockchain;

performing a consensus processing on the target transaction in the candidate block using a consensus algorithm supported by the blockchain;

inserting a transaction idempotent record corresponding to the identifier of the target transaction into the transaction idempotent table on the blockchain; and executing, by an transaction execution environment of the first member node device, the target transaction by using a transaction execution program code.

12. The computer-implemented system of claim 11, wherein the operations further comprise:

determining that a plurality of monotonically increasing transaction identifiers have consecutive values after the identifier of the target transaction is inserted into the transaction idempotent table; and in response to determining that the plurality of monotonically increasing transaction identifiers have consecutive values after the identifier of the target transaction is inserted into the transaction idempotent table, recording the plurality of monotonically increasing transaction identifiers with consecutive values in the transaction idempotent table based on an interval.

13. The computer-implemented system of claim 11, wherein the target transaction further comprises a reference time parameter based on a time stamp to assist determining that the target transaction is a valid transaction within a transaction validity period.

14. The computer-implemented system of claim 13, wherein the operations further comprise:

prior to determining that the transaction idempotent table stores the transaction idempotent record corresponding to the identifier of the target transaction, determining that the target transaction is the valid transaction within the transaction validity period based on the reference time parameter; and in response to determining that the target transaction is the valid transaction within the transaction validity period, determining that the transaction idempotent table stores the transaction idempotent record corresponding to the identifier of the target transaction.

* * * * *